US008765871B2

(12) United States Patent
Cox

(10) Patent No.: US 8,765,871 B2
(45) Date of Patent: Jul. 1, 2014

(54) NON-POROUS THERMOFORMABLE POLYURETHANE SOLID

(75) Inventor: Timothy Lee Cox, Excelsior Springs, MO (US)

(73) Assignee: ETS Surfaces, LLC, Excelsior Springs, MO (US)

( * ) Notice: Subject to any disclaimer, the term of this patent is extended or adjusted under 35 U.S.C. 154(b) by 212 days.

(21) Appl. No.: 13/101,410

(22) Filed: May 5, 2011

(65) Prior Publication Data

US 2012/0283384 A1    Nov. 8, 2012

(51) Int. Cl.
| | |
|---|---|
| *B29C 45/00* | (2006.01) |
| *C08K 3/22* | (2006.01) |
| *C08L 75/04* | (2006.01) |
| *B29C 39/00* | (2006.01) |
| *C08G 18/36* | (2006.01) |

(52) U.S. Cl.
CPC ............. *C08K 3/22* (2013.01); *B29C 39/003* (2013.01); *B29C 45/00* (2013.01); *C08G 18/36* (2013.01); *C08L 75/04* (2013.01)
USPC ................ 524/786; 264/328.18; 427/427.4

(58) Field of Classification Search
CPC ........ C08L 75/04; C08K 3/22; B29C 39/003; B29C 45/00; C08G 18/36
USPC ........................................................ 524/786
See application file for complete search history.

(56) References Cited

U.S. PATENT DOCUMENTS

| | | | | |
|---|---|---|---|---|
| 4,107,256 A | * | 8/1978 | Conrad et al. ................ 264/310 |
| 4,145,515 A | * | 3/1979 | Pogozelski et al. ............. 528/77 |
| 4,546,120 A | * | 10/1985 | Peerman et al. ............... 521/159 |
| 2009/0098302 A1 | * | 4/2009 | Raday ......................... 427/407.1 |
| 2009/0203809 A1 | * | 8/2009 | Marquardt et al. ............. 521/67 |
| 2009/0275249 A1 | * | 11/2009 | Miskovic et al. ............... 442/59 |

FOREIGN PATENT DOCUMENTS

| | | | |
|---|---|---|---|
| EP | 1964866 A2 | * | 9/2008 |
| JP | 2005002297 A | * | 1/2005 |

OTHER PUBLICATIONS

Machine translated English equivalent of JP 2005-002297 (Jan. 2005, 11 pages).*
Machine translated equivalent of EP 1964866 (Sep. 2008, 14 pages).*

* cited by examiner

*Primary Examiner* — Susannah Chung
*Assistant Examiner* — Brieann R Fink
(74) *Attorney, Agent, or Firm* — Moazzam & Associates, LLC

(57) ABSTRACT

The subject disclosure presents systems and methods for manufacturing a non-porous thermoformable polyurethane solid by combining an uncured polyurethane resin with Aluminum Trihydrate (ATH), a plurality of particulates, molecular sieves, and color particulates. This combination is mixed in a vacuum for a time period sufficient to initiate an exothermic reaction within the mixture. After the time period, the exothermically reacting mixture is allowed to cure to form the polyurethane solid. The curing may occur in a mold, i.e. by pouring or injecting the mixture into the mold. Alternatively, the mixture may be sprayed on to a surface and allowed to cure.

17 Claims, 3 Drawing Sheets

NON-POROUS THERMOFORMABLE POLYURETHANE SOLID

BACKGROUND OF THE INVENTION

1. Field of the Invention

The present invention relates to forming polyurethanes. More specifically the present invention relates to forming a medium-to-high durometer, non-porous, and thermoformable polyurethane using bio-renewable and recycled ingredients.

2. Background of the Invention

The state of the art for constructing surfaces such as bars, countertops, etc., has, for decades, involved acrylics. From the time that DUPONT developed their acrylic-based CORIAN material until today, acrylics and acrylic/polyester blends have been in dominant use for such applications. The benefits of such composite materials are numerous: acrylic/polyester countertops integrate well with other surfaces and structures without forming lips or seams when fabricated, and are non-porous, therefore being suitable for sterile applications such as hospitals.

However, several major limitations exist for these materials. Specifically, they are extremely brittle, crack and scratch very easily, and are fairly expensive and heavy. It takes a substantial amount of labor to transport these products to their desired locations, while their brittleness only adds to the overall costs of using them as interior surfaces.

Another popular composite solid uses a polyurethane resin as its base. Polyurethane is typically manufactured with two groups of at least bifunctional substances as reactants: compounds with isocyanate groups, and compounds with active hydrogen atoms. The physical and chemical character, structure, and molecular size of these compounds influence the polymerization reaction, as well as ease of processing and final physical properties of the finished polyurethane. In addition, additives such as catalysts, surfactants, blowing agents, cross linkers, flame retardants, light stabilizers, anti-settling agents, and fillers are used to control and modify the reaction process and performance characteristics of the polymer.

However, existing polyurethanes are extremely susceptible to water. Specifically, any moisture content influences the reaction and creates bubbles of $CO_2$ gas. This results in foaming within the material, making it porous. The porosity automatically disqualifies a polyurethane from being used in sterile applications as well as kitchen countertops, sinks, etc.

The use of polyols derived from vegetable oils to make polyurethane products began attracting attention around 2004. The rising costs of petrochemical feedstocks and an enhanced public desire for environmentally friendly green products have created a demand for these materials. Memory foam mattresses and spray-on polyurethane foam insulation for buildings are becoming increasingly common. The Ford Motor Company recently announced its intentions to use polyurethane foam made using natural oil polyols in the seats of its Ford Mustang. However, much of the development being performed on the use of natural-oil polyurethane products is limited to, for example, seats, headrests, armrests, soundproofing, and body panels. In other words, these applications make use of the foaming properties of polyurethane, and do not satisfy the need for a non-porous polyurethane solid. What is needed is a durable, non-porous, thermoformable, and colorable polyurethane.

SUMMARY OF THE INVENTION

The subject disclosure addresses the above-identified problems in the conventional art by combining an uncured polyurethane resin with Alumina Trihydrate (ATH), particulate glass, molecular sieves, and color particulates, along with anti-settling agents such as fumed silicas. Mixed under a vacuum, the resultant mixture exothermically reacts in a mold and is cured. The cured polyurethane is a medium-to-high durometer, impact-resistant, fire-retardant, thermoformable, and non-porous solid. This makes the inventive solid applicable to a variety of applications such as countertops, bathtubs, sinks, etc. In exemplary embodiments, the usage of natural oil polyols, such as soy polyols, as well as recycled particulate glass, ensures that the raw materials that are used to manufacture the inventive polyurethane solid come from renewable and environmentally friendly sources.

In one exemplary embodiment, the present invention is a thermoformable non-porous polyurethane material including a plurality of isocyanates, a plurality of polyols, alumina trihydrate (ATH), particulate glass, a plurality of molecular sieves, and fumed silica. These ingredients are combined and mixed in a vacuum mixer for a duration and at a vacuum level sufficient to induce an exothermic polymerization reaction. The exothermically reacting mixture is formed into a composite material after said duration of mixing. The plurality of isocyanates and the plurality of polyols together constitute between 20-70% of a total content of the mixture, the ATH constitutes between 15-30% of the total content of the mixture, the particulate glass, or other particulates, constitute between 5-50% of the total content of the mixture, and the plurality of molecular sieves constitutes between 2-10% of the total content of the mixture. A plurality of color particulates may be added for color. The anti-settling or thickening agent, such as fumed silica, is added to constitute 0.1%-10% of the mixture. The mixture is formed into the composite material by pouring or injecting into a mold and allowing curing.

In another exemplary embodiment, the present invention is a method for manufacturing a thermoformable non-porous polyurethane material, including combining a plurality of isocyanates, a plurality of polyols, alumina tri-hydrate, particulate glass, a plurality of molecular sieves, and fumed silica to form a mixture, mixing the mixture under a vacuum, wherein the mixing occurs for a time period sufficient to create an exothermically reacting mixture, and forming a composite material using the exothermically reacting mixture by curing the exothermically reacting mixture for a curing period. The composite material may be formed by pouring the exothermically reacting mixture into a mold, injecting the exothermically reacting mixture into a mold, or spraying the exothermically reacting mixture on to a surface. The vacuum level is maintained at 15-20 inches of mercury, while a temperature of the exothermically reacting mixture is maintained at no greater than 10 degrees F. above an ambient temperature.

DETAILED DESCRIPTION OF THE INVENTION

Figure 1:
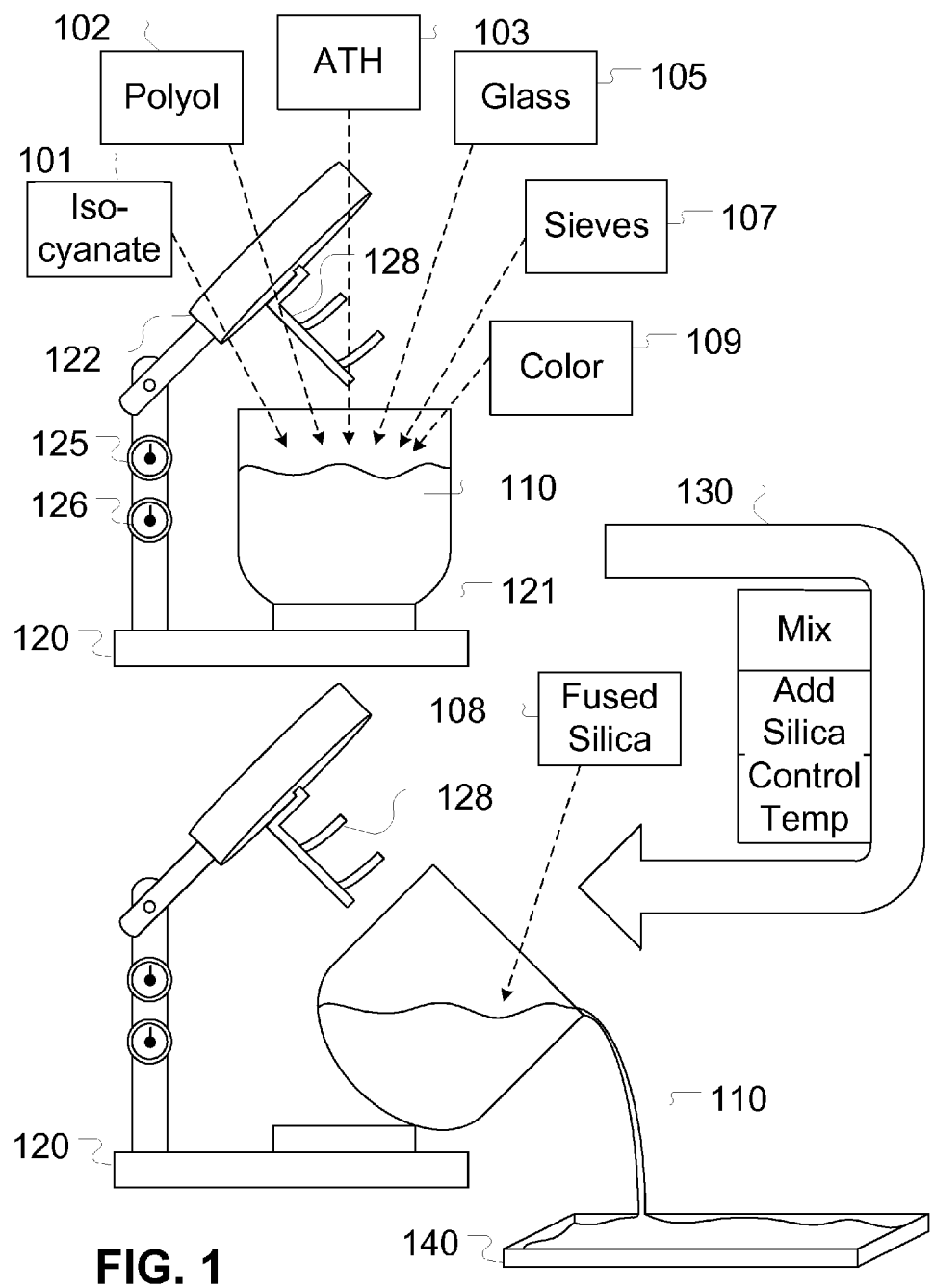
FIG. 1 shows a system for manufacturing a polyurethane solid, according to an exemplary embodiment of the present invention.

The following detailed description presents exemplary embodiments of the present invention, including systems and methods for manufacturing a thermoformable polyurethane solid by combining an uncured polyurethane resin with Alumina Trihydrate (ATH), cast particulates, molecular sieves, and color particulates. This combination is mixed in a vacuum for a time period sufficient to initiate an exothermic reaction within the mixture. After the time period, the exothermically reacting mixture is allowed to cure to form the polyurethane solid. The curing may occur in a mold, e.g., by pouring or injecting the mixture into the mold. Alternatively, the mixture may be sprayed on to a surface and allowed to cure.

Generally, the resin includes a mixture of a plurality of isocyanates and a plurality of polyols, the resin constituting between 20% and 70% of the total contents of the mixture. ATH is pure or pre-mixed with a small percentage of color particulates, and constitutes between 15% and 30% of the total contents of the mixture. Finely ground/powdered cast particulates constitute between 5% and 50% of the total contents of the mixture, and may include recycled powdered glass. A plurality of molecular sieves, such as 3A or 4A molecular sieves, is used to adsorb water molecules from the mixture, and constitutes between 2% and 10% of the total contents of the mixture. Pigments, or color particulates, constitute between 1% and 15% of the total contents of the mixture. In some embodiments, a combination of molecular sieves and color particulates constitutes approximately 5% of the total contents of the mixture. Fumed silica or other anti-settling or thickening agents constitute 0.1%-10% of the mixture to retard separation and settling of the particulate fillers. Finally, up to 8% of the total contents of the mixture may include a UV stabilizer.

The resulting polyurethane solid is medium-to-high durometer (hardness), impact-resistant, fire-retardant, thermoformable, and non-porous. This makes the polyurethane solid desirable for a variety of applications such as countertops, bathtubs, sinks, etc. In some exemplary embodiments, the amount of particulates such as powdered glass may be increased to up to 70% of the total contents of the mixture, resulting in a harder quartz-like solid having several additional applications, such as extremely stain and scratch resistant table and cabinet tops. This resultant is also very chemical resistant, making it useful for laboratory furniture and table tops. Further, the usage of natural oil polyols, such as soy polyols as well as recycled particulate glass ensures that the raw materials that are used to manufacture this polyurethane solid come from renewable and environmentally friendly sources.

A "resin", as used herein and throughout this disclosure, is a combination of a plurality of polyols and a plurality of isocyanates that may be packaged and sold together, but are kept separate until the process begins. The resin may be customized for the application, with the properties of the resulting mixture having a viscosity and a gel time that are adjusted using one or more catalysts. In one exemplary embodiment, the mixture uses a resin comprising 46% (±4%) soy polyol and 54% (±4%) Methylene Diphenyl Diisocyanate (MDI), with the resulting resin having a viscosity of 900 centipoise, and a gel time of 28-30 minutes. Such a combination is commercially available, for instance, from the Urethane Soy Systems Company.

A "polyol", as used herein and throughout this disclosure, is a compound with multiple hydroxyl functional groups available for organic reactions. Polymeric polyols are mainly used as reactants to make other polymers, and may react with isocyanates to make polyurethanes. Some vegetable oils, such as soybean oil, peanut oil, and canola oil, contain carbon-carbon double bonds, but no hydroxyl groups. There are several processes used to introduce hydroxyl groups onto the carbon chain of the fatty acids, and most of these involve oxidation of the C—C double bond. The vegetable oils may further be treated with ozone. In one exemplary embodiment, the present invention uses a soy polyol, thereby ensuring a bio-renewable raw material.

An isocyanate includes any organic compound containing an isocyanate group, i.e. the functional group of atoms N=C=O (1 nitrogen, 1 carbon, 1 oxygen). An isocyanate may have more than one isocyanate group. For instance, an isocyanate that has two isocyanate groups is known as a diisocyanate. Diisocyanates such as MDI are generally manufactured for reaction with polyols in the production of polyurethanes.

Alumina tri-hydrate (ATH), or hydrated alumina, is a non-toxic, non-corrosive, flame-retardant, and smoke suppressant material utilized in elastomeric applications. ATH is a relatively hard filler and includes chemically bound water that is released at high temperatures. Consequently, ATH is frequently used as a fire retardant material. In other words, materials including ATH are self-extinguishing if ignited. In one exemplary embodiment, the present invention uses a combination of ATH with color particulates.

Fumed silica consists of microscopic droplets of amorphous silica fused into branched, chainlike, three-dimensional secondary particles which then agglomerate into tertiary particles. The resulting powder has an extremely low bulk density and high surface area. Its three-dimensional structure results in viscosity-increasing, thixotropic behavior when used as a thickener or reinforcing filler.

FIG. 1 shows the manufacture of a thermoformable polyurethane solid, according to an exemplary embodiment of the present invention. The raw materials, e.g., isocyanates 101, polyols 102, ATH 103, particulate glass 105, molecular sieves 107, and color particulates 109, are all weighed as per the proportional percentages described herein and added at the same time to a vacuum chamber 121 of a vacuum mixer 120. After 10-15 minutes of mixing under vacuum, fumed silica 108 is added to the mix, and the vacuum mixer continues mixing for another 1-3 minutes. Vacuum mixer 120 includes at least a mixing lid 122, a pressure gauge 125, a temperature gauge 126, and a stirring portion 128. The sensors for measuring temperature and pressure (not shown) may be attached to stirring portion 128 coupled to mixing lid 122, with wires sending signals back to gauges 125, 126. Further, although a standard vacuum mixer is shown, any other type of vacuum mixer may be used as is known in the art. The only requirement is that the vacuum mixer is able to mix mixture 110 for a duration sufficient to induce an exothermic reaction within mixture 110, generally no longer than 18 minutes.

Arrow 130 shows the mixing process for this exemplary embodiment. Mixture 110 is mixed for approximately 10-15 minutes, a range of time experimentally shown to be ideal for the above listed proportions of ingredients. Then the fumed silica is added, and the mixture is mixed for another 1-3 minutes. Throughout the mixing time, the vacuum chamber 121 is maintained at between 15 and 20 inches of mercury, or approximately 0.5-0.6 atmospheres. Further, the environment external to vacuum mixer 120 is either maintained at room temperature or adjusted so as to maintain an internal temperature of no greater than 10 degrees F. over the ambient temperature. For the purposes of this disclosure, an ambient or room temperature ranges between 70° F. and 80° F. In other words, the pressure and temperature inside vacuum chamber 121 is adjusted so that the exothermically reacting mixture 110 does not reach an excessive temperature. Under high temperatures and low pressures, the exothermically reacting mixture 110 may begin to boil. This is expected; however, the temperature should not exceed 10 degrees F. over the ambient temperature, which is generally between 70° F. and 80° F.

After the 16-18 minute period has passed, mixture 110 is sufficiently mixed and the exothermic reaction is occurring uniformly throughout mixture 110. At this point, vacuum mixer 120 is shut down, the vacuum released from vacuum chamber 121, and exothermically reacting mixture 110 is poured into a mold 140. The exothermically reacting mixture 110 is poured evenly into mold 140 to avoid air entrapment. An additional period of time, or a curing period, enables the exothermically reacting mixture 110 to cure to form a polyurethane solid. Mold 140 is shown to be a flat mold ideal for creating a polyurethane sheet. However, mold 140 may be any other shape such as that of a sink, bathtub, or any conceivable shape requiring a non-porous polyurethane solid, such as the one manufactured by the inventive system.

In certain exemplary embodiments of the present invention, each of the materials may be added one at a time to a container such as a blending kettle, and stirred with a mixing paddle without removing from the scale to roughly blend the mixture. This rough blending ensures that fillers are not allowed to stay "caked" to the bottom, and are uniformly distributed throughout the mixture. The blending kettle may then be sealed, applied under vacuum, and vacuum mixed using any appropriate blending platform. The kettle would then be moved by a gantry to the prepared mold.

Figure 2:
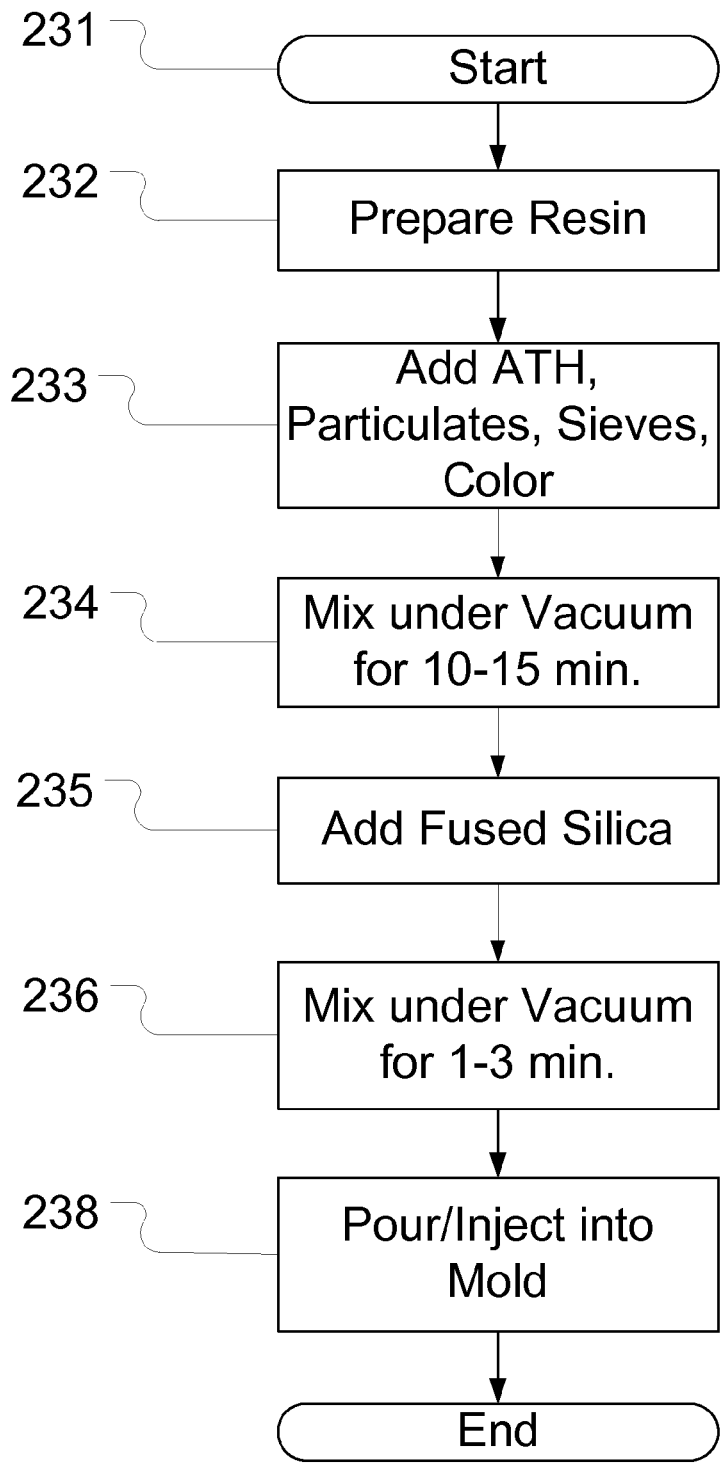
FIG. 2 shows a method for manufacturing a polyurethane solid, according to an exemplary embodiment of the present invention.

FIG. 2 shows a method for manufacturing a thermoformable polyurethane solid, according to an exemplary embodiment of the present invention. The method begins 231 by preparing the raw materials required to form the polyurethane. In this embodiment, raw materials for the resin are prepared 232 in one of several ways. For instance, a plurality of polyols and a plurality of isocyanates are measured out by weight and poured into a container, or a chamber of a vacuum mixer. Then, before the plurality of polyols and isocyanates is mixed, the additional ingredients, including the molecular sieves, ATH and/or DURASTONE particulates, color particulates, particulate glass, UV stabilizers, and any desired special effects particulates, are measured out by weight and added 233. Preparation of the ingredients may take a short amount of time, such as 10 minutes, or may take longer. However, to ensure a uniform exothermic reaction prior to curing, the time to combine all the ingredients should be minimized.

The combined ingredients are then poured into a vacuum mixer, and the vacuum mixer is started 234. The contents are mixed for about 10-15 minutes, and then the fumed silica is added 235. The contents continue to mix under a vacuum 236 of 15-20 inches of mercury until an exothermic reaction begins 237. If the exothermic reaction has not yet started, then the mixing 236 continues until the entire mixture is exothermically reacting. This decision may be performed, for instance, by monitoring a temperature of the contents of the vacuum chamber or the mixture using the apparatus shown above with respect to FIG. 1. When a desired temperature is reached, which should take an additional 1-3 minutes based on experimental results, the mixture is uniformly undergoing an exothermic reaction. At this point, the vacuum mixer is powered down and the exothermically reacting mixture is poured or injected into a mold 238.

It is very helpful to maintain the vacuum level at approximately 15-20 inches of mercury, because higher levels may cause the exothermically reacting mixture to boil, while lower levels do not remove enough air, and the resulting polyurethane solid may be porous due to formation of air holes. In addition, it is also important to keep the external environment as dry as possible, so as to prevent any ambient moisture reacting with the mixture to form a porous solid. Another important factor is the timing of the process. Generally, from making first contact, polyols and isocyanates begin to exothermically react in approximately 25 minutes, depending on several factors. The present invention accounts for this by setting aside approximately 10-12 minutes for measuring out and combining all the ingredients, and approximately 15-18 minutes for mixing under vacuum. This ensures that at the time of pouring/injecting into the mold, the mixture is uniformly exothermically reacting. A final crucial factor is the temperature of the process. As described above, higher temperatures cause boiling of the exothermically reacting mixture while under vacuum. Consequently, the present inventive method prescribes that the ambient temperature be as close to room temperature as possible. It is further ideal for the ambient temperature to be maintained above at least 60 degrees F. Further, externally heating the mixture may provide for a quicker curing time, but does not affect the quality of the finished product in any substantial way. For instance, the cast solid may be left to cure at ambient temperature, or the curing may be accelerated by placing in an oven, either for curing or for post-curing. The temperature of the oven should not exceed 150 F.

In one exemplary embodiment of the present invention, the 20-70% polyurethane blend of polyols and isocyanates is commercially available from the URETHANE SOY SYSTEMS COMPANY. In this embodiment, the molecular sieves of 3 or 4 Angstroms are part of the MOLSIV ADSORBENTS commercially available from UOP, LLC. The 15-30% ATH blend is commercially available from SAMCO. The 1-15% pigments may be organic pigments, or may include metallic oxides, both of which are available from THE SHEPHERD COLOR COMPANY. 5-30% of glass particulates include recycled powdered glass, commercially available from REFLECTIVE RECYCLING of Texas. The glass particulates may also include the finest mesh of BRITE BLAST abrasive mix available from ABRASIVE WAREHOUSE & EQUIPMENT, also from Texas. The glass particulates are also available from the SURFACE FINISHING COMPANY in Fairfax, Kans. The up-to-8% of UV stabilizer may be the LOWILITE UV B1211 product, available from CHEMTURA. The mixture may also include different cast particulates for different effects, such as granite or quartz effects available from ARIZONA STONE. The special effects particulates may be added as an alternative to or in addition to the glass particulates. The resulting surface of the cast urethane parts as described above mimics the finish on the mold. I.e. the finish may be textured, or smooth (reflective). Further, the resulting surface may be milled, sanded, and otherwise finished. The resulting surface has a hardness level of approximately 100 on a Type A durometer. Further, the resulting surface is scratch and stain resistant. Finally, depending on the exact percentages of filler particulates used, the resulting polyurethane solid ranges in weight from 90 lbs to 120 lbs per cubic foot. Fumed silica is added as anti-settling or thickening agent, commercially available as AEROSIL SYNTHETIC AMORPHOUS SILICA 200.

Although the general proportions for each ingredient in the mixture are approximated above, it is to be noted that the proportional amount of particulate glass may vary considerably. For instance, while 20% glass provides a good scratch-resistant finish to the polyurethane solid, up to 65% glass in the mixture results in a quartz-like solid that may be cut or shaped using traditional stone-cutting tools. The glass, which may be available from a plurality of sources, includes powdered recycled glass as is typically used for sanding purposes, and resembling a white powder. Further, as described above, the ATH blend used by the inventive method is also used in acrylic formation. However, the present inventive polyurethane uses the same combination and ends up being superior to acrylics in several ways, i.e., by being lighter, less brittle, more flexible, and uses bio-renewable and/or recycled ingredients.

Figure 3:
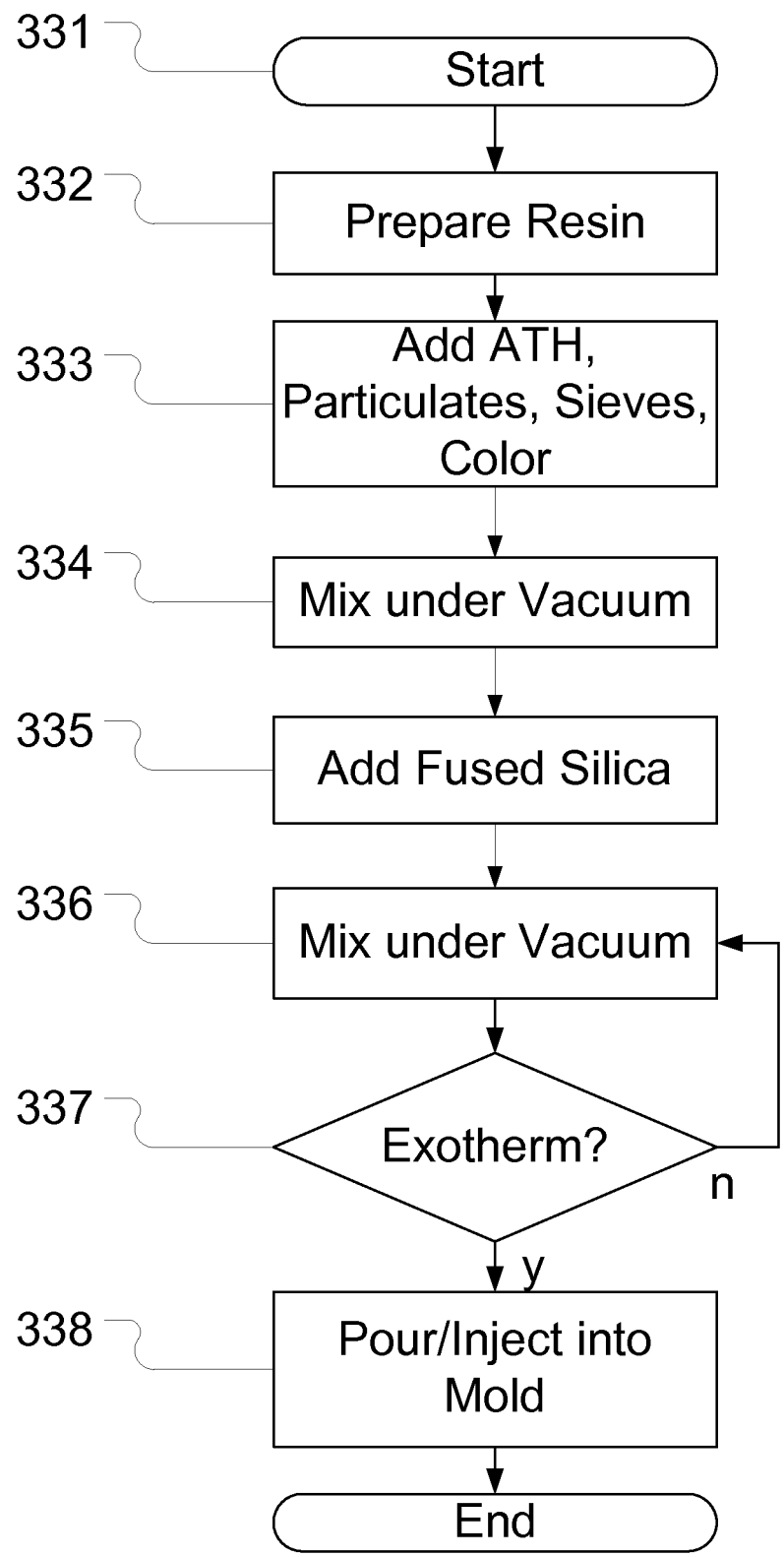
FIG. 3 shows another method for manufacturing a polyurethane solid, according to another exemplary embodiment of the present invention.

FIG. 3 shows a method for manufacturing a thermoformable polyurethane solid, according to an exemplary embodiment of the present invention. This method differs from FIG. 2 in that this method is adapted to be applied to a recipe of ingredients that may differ from the one described above. The method begins 331 by preparing the raw materials required to form the polyurethane. In this embodiment, raw materials for the resin are prepared 332 in one of several ways. For instance, a plurality of polyols and a plurality of isocyanates are measured out by weight and poured into a container, or a chamber of a vacuum mixer. Then, before the plurality of polyols and iscocyanates is mixed, the additional ingredients, including the molecular sieves, ATH and/or DURASTONE particulates, color particulates, particulate glass, UV stabilizers, and any desired special effects particulates, are measured out by weight and added 333. The combined ingredients are then poured into a vacuum mixer, and the vacuum mixer is started 334. The contents are mixed thoroughly, and then fumed silica is added 335.

The contents continue to mix 336 under a vacuum until an exothermic reaction begins 337. If the exothermic reaction has not yet started, then the mixing 336 continues until the entire mixture is exothermically reacting. This decision may be performed, for instance, by monitoring a temperature of the contents of the vacuum chamber or the mixture using the apparatus shown above with respect to FIG. 1. When a desired temperature is reached throughout the mixture, the mixture is uniformly undergoing an exothermic reaction. At this point, the vacuum mixer is powered down and the exothermically reacting mixture is poured or injected into a mold 338.

As in the previous embodiment, it is helpful to maintain the vacuum level at approximately 15-20 inches of mercury to avoid boiling at higher pressures or formation of formation of air holes at lower temperatures. Further, although previous embodiments set aside approximately 10-12 minutes for measuring out and combining all the ingredients, and approximately 15-18 minutes for mixing under vacuum, these timings may vary in the present embodiment.

As described above, the exothermically-reacting mixture may be cured within a mold, for instance to create polyurethane sheets. However, the mixture may also be sprayed onto a surface and allowed to cure on the surface. Layers of the mixture may be sprayed at timed intervals allowing for production of solids having varying properties.

Further, the present invention is highly thermoformable. In other words, with application of sufficient heat, a sheet composed of the inventive polyurethane solid may be manipulated into a desired shape, and cooled to remain in that shape. This is a significant advantage over acrylic products, which may only be thermoformed to approximately a ⅞" diameter. Further, thermoforming the inventive polyurethane solid requires a temperature of approximately 160 degrees F., whereas acrylic requires heating of approximately 220 degrees F. to be thermoformed. Moreover, the ubiquitous mixture of 80% acrylic and 20% polyester is extremely hard and therefore not thermoformable. This means that where prior-art solids have to be molded to the particular application, the inventive polyurethane solid may be molded into standard or uniform shapes and subsequently thermoformed into the desired shape.

Other advantages of the present invention include that the inventive polyurethane solid has the unique advantage of being colored any color, including black, using the appropriate color particulates. Being significantly lighter than acrylics, a single individual may carry a sheet or product composed of the inventive polyurethane solid without additional assistance. The hardness level, slight flexibility, and impact-resistance of the inventive solid prevent it from being damaged easily. Further, the inventive polyurethane solid can replace existing acrylic/polyester solid surfaces used in universities, dormitory rooms, hotel/motel shower walls, vanities, and even sensitive applications such as hospitals, owing to its non-porous properties. Colloidal silver and other equivalents may be added to the mixture to provide bactericidal and anti-fungal properties. The mixture may be fluorinated; as such polyurethanes contain high percentage of fluorine-carbon bond which is the strongest bond among all chemical bonds, therefore providing excellent resistance to UV, acids, alkali, salts, chemicals, solvents, weathering, corrosion, fungi and microbes. Finally, the inventive polyurethane solid is also naturally flame-retardant because ATH and the molecular sieves release stored water with heat.

The foregoing disclosure of the exemplary embodiments of the subject disclosure has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A thermoformable, non-porous, polyurethane material, comprising:
   a plurality of isocyanates;
   a plurality of polyols;
   alumina trihydrate (ATH);
   a plurality of particulates; and
   a plurality of molecular sieves;
   wherein the plurality of isocyanates, the plurality of polyols, the ATH, the plurality of particulates, and the plurality of molecular sieves are mixed in a vacuum mixer to form a mixture,
   wherein a duration of mixing and a vacuum level of the vacuum mixer are sufficient to induce an exothermic polymerization reaction with a temperature of the exothermic polymerization reaction being maintained at no greater than 10 degrees F. over an ambient temperature to prevent the mixture from boiling, and
   wherein the mixture is formed into a composite material after said duration of mixing, the composite material being medium-to-high durometer, impact-resistant, fire-retardant, thermoformable, and non-porous due to the exothermic polymerization reaction at the specified temperature.

2. The thermoformable, non-porous, polyurethane material of claim 1, wherein
the plurality of isocyanates and the plurality of polyols together constitute between 20-70% of a total content of the mixture,
wherein the ATH constitutes between 15-30% of the total content of the mixture,
wherein the plurality of particulates constitutes between 5-50% of the total content of the mixture, and
wherein the plurality of molecular sieves constitutes between 2-10% of the total content of the mixture.

3. The thermoformable, non-porous, polyurethane material of claim 2, further comprising a plurality of color particulates that constitute between 1 and 15% of the mixture, wherein the plurality of particulates includes cast particulates for special effects.

4. The thermoformable, non-porous, polyurethane material of claim 1, wherein the duration of mixing is between 15 and 18 minutes, and wherein the vacuum level is between 15 and 20 inches of mercury.

5. The thermoformable, non-porous, polyurethane material of claim 1, wherein the mixture is formed into the composite material by pouring or injecting into a mold and allowing curing.

6. The thermoformable, non-porous, polyurethane material of claim 1, wherein the mixture is formed into the composite material by spraying the mixture onto a surface.

7. The thermoformable, non-porous, polyurethane material of claim 1, wherein the composite material is thermoformed to a desired shape after being cured.

8. The thermoformable, non-porous, polyurethane material of claim 1, wherein the polyol is a natural oil polyol.

9. The thermoformable, non-porous, polyurethane material of claim 1, wherein a resin formed by the isocyanates and the polyols has a viscosity of approximately 900 centipoise and a gel time of approximately 30 minutes.

10. The thermoformable, non-porous, polyurethane material of claim 1, wherein the plurality of particulates includes powdered recycled clear glass.

11. The thermoformable, non-porous, polyurethane material of claim 10, wherein the plurality of particulates constitutes up to 65% of the total content of the mixture.

12. The thermoformable, non-porous, polyurethane material of claim 1, wherein the vacuum mixer includes a thermometer to measure the temperature of the exothermically reacting mixture.

13. A method for manufacturing a thermoformable, non-porous, polyurethane material, the method comprising:
combining a plurality of isocyanates, a plurality of polyols, alumina tri-hydrate, a plurality of particulates, and a plurality of molecular sieves to form a mixture;
mixing the mixture under a vacuum, wherein the mixing occurs for a time period sufficient to create an exothermically reacting mixture while maintaining a temperature of the exothermically reacting mixture to no greater than 10 degrees F. over an ambient temperature to prevent the mixture from boiling; and
forming a composite material using the exothermically reacting mixture, the composite material being medium-to-high durometer, impact-resistant, fire-retardant, thermoformable, and non-porous due to the exothermic polymerization reaction at the specified temperature.

14. The method of claim 13, wherein the forming the composite material further comprises curing the exothermically reacting mixture for a curing period.

15. The method of claim 14, wherein the forming the composite material further comprises one or more of pouring the exothermically reacting mixture into a mold, injecting the exothermically reacting mixture into a mold, or spraying the exothermically reacting mixture on to a surface.

16. The method of claim 13, wherein
the plurality of isocyanates and the plurality of polyols together constitute between 20-70% of a total content of the mixture,
wherein the ATH constitutes between 15-30% of the total content of the mixture,
wherein the plurality of particulates constitutes between 5-50% of the total content of the mixture, and
wherein the plurality of molecular sieves constitute between 2-10% of the total content of the mixture.

17. The method of claim 16, further comprising coloring the composite material by adding a plurality of color particulates that constitute between 1-15% of the mixture before mixing under vacuum.

* * * * *